United States Patent [19]

Brill, deceased et al.

[11] Patent Number: 4,483,774

[45] Date of Patent: Nov. 20, 1984

[54] OIL CONCENTRATING METHOD AND APPARATUS

[76] Inventors: Eugene L. Brill, deceased, late of Broadview Heights, Ohio; by Beatrice Brill, administrator, 1803 W. Royalton Rd., Broadview Heights, Ohio 44147

[21] Appl. No.: 590,147

[22] Filed: Mar. 16, 1984

[51] Int. Cl.³ .............................. C02F 1/40; B01D 21/26
[52] U.S. Cl. ................................... 210/788; 210/805; 210/806; 210/258; 210/259; 210/294; 210/512.1; 210/537; 210/540; 210/DIG. 5
[58] Field of Search ............... 210/608, 787, 788, 799, 210/805, 806, 808, 258, 259, 294, 512.1, 537, 540, DIG. 5, 512.3

[56] References Cited

U.S. PATENT DOCUMENTS

| | | | |
|---|---|---|---|
| 2,010,435 | 8/1935 | Matheson | 210/512.1 |
| 2,016,642 | 10/1935 | Lincoln | 210/512.1 |
| 2,088,294 | 7/1937 | Geiger | 210/512.1 |
| 2,308,670 | 1/1943 | Bolton | 210/512.1 |
| 3,635,342 | 1/1972 | Mourlon | 210/787 |
| 3,789,988 | 2/1974 | Valibouse | 210/512.1 |
| 4,043,912 | 8/1977 | Bascope | 210/537 |
| 4,142,972 | 3/1979 | Nebeker | 210/787 |
| 4,264,454 | 4/1981 | Ankersmit | 210/787 |
| 4,357,242 | 11/1982 | Chandler | 210/512.1 |
| 4,366,069 | 12/1982 | Dudrey | 210/512.1 |

Primary Examiner—Ernest G. Therkorn
Attorney, Agent, or Firm—Fay & Sharpe

[57] ABSTRACT

A tangentially disposed inlet (22) discharges lighter and heavier fluids into a basin (A) causing the fluid mass in the basin to rotate at a rate proportional to the flow. A heavier fluid drain (36) or drains (44) removes most of the heavier fluid causing a free vortex to form above their inlets. This vortex causes an inward spiraling surface current to sweep the floating layer into the center of the vortex, but it lacks the downward velocity to draw it into the heavier fluid stream. A fluid flow controller (42 and 46) regulate this flow so that a depth is maintained that is related to the incoming flow such that the diameter of the concentric layers of lighter and heavier fluids surrounding the eye of the vortex remain essentially constant while the main flow rate slowly varies over a very wide range.

A light fluid concentrate tube inlet (32) is placed at the eye of the free vortex. Flow to this tube causes a smaller, amplified, continuation of the main vortex to form. The lighter fluid is drawn into this vortex, encased in a spiraling stream of heavier fluid. It is carried in an essentially undispersed state, at a rate controlled by the bore of the tube (30), to a small, automatic, continuous decanter (C) where the accompanying heavier fluid is removed.

20 Claims, 13 Drawing Figures

OIL CONCENTRATING METHOD AND APPARATUS

BACKGROUND OF THE INVENTION

The present invention pertains to the art of fluid separation. It is applicable to the separation of lighter liquids, such as oil, and heavier liquids, such as water. The invention finds particular application in the automatic removal and decantation of the contents of a layer of oil floating upon water contained in an enclosed basin and will be described with particular reference thereto. However, it is to be appreciated that the invention has other applications including the separation of various heavier and lighter fluids including foam, froth, gasoline, grease, emulsions, suspended particulates, floc, and the like from water, acids, alkali solutions, and the like.

Commonly oil enters process and waste water streams almost continuously, but in small amounts. The small, continuous flow causes problems with processes and with equipment if not removed. Usually a stilling basin is provided where the oil and water stagnate sufficiently for the oil to float to the surface.

Heretofore, various systems were developed for separating the oil and water. In one technique, a wier was disposed adjacent a downstream end of the basin which retained the oil while allowing the water to pass thereunder into a public stream. Periodically, the floating oil was removed by permitting it to flow over the weir to a drain. With the advent of pollution laws, the drain was connected with a tank from which the oil could be recovered.

One of the problems with this technique was that an attendant was required to monitor the oil level in the basin and control the overflow of the wier. The attendant had to position the wier overflow to fill the decanting tank. Once the tank was filled, the attendant stopped the flow into the tank and waited for the oil and water therein to separate or decant. After the oil and water separated, the attendant pumped the water from the bottom of the tank back into the basin and pumped the oil to a storage tank.

As the layer of oil in the basin became thinner, this technique became increasingly more labor intensive. Trying to maintain the basin free of a thin surface layer of oil was prohibitively expensive. Although attempts were made to automate the process, maintenance on the automated equipment was very expensive and the automated processes unsatisfactory.

As a cheaper solution, many operators permitted the oil to accumulate in the basin over long periods, e.g., months or years. As is to be appreciated, evaporation of low boiling fractions of the oil caused hydrocarbon contamination and an explosion hazard. Further, as the more volatile fractions evaporated, the specific gravity and viscosity of the oil increased. If left long enough, it reached neutral bouyancy with the water and passed under the baffle into the public stream or the lake. With the passage of tighter antipollution laws, these practices became not only unsatisfactory but also illegal.

Others have suggested devices that automatically and continuously remove and decant floating oil from basins. However, these devices require that operating conditions be maintained within very narrowly prescribed limits. One example of these continuous and automatic devices is a selective adhesion-type oil skimmer equipped with an automatic continuous decanter for removal of modest flows of relatively viscous oils.

Others have recognized that a vortex separates a mixture of lighter and heavier fluids. The lighter components collect toward the center of the vortex and the heavier components remain around the periphery. This technique has been used for separating a lighter liquid, such as an oil slick, from a heavier liquid, such as water. As shown for example in U.S. Pat. No. 3,635,342 to Mourlon or U.S. Pat. No. 4,142,972 to Nebeker, the vortex systems generally include an impeller, water jet, or the like, for creating a vortex in the water. The vortex forms a well in which a pool of oil collects. A pump is provided for removing oil which has accummulated in the vortex pool.

The prior art vortex separators have various drawbacks. Each requires a mechanical vortex creation means, such as an impellor.

The present invention contemplates a new and improved vortex separator which overcomes the above-referenced problems and others.

SUMMARY OF THE INVENTION

In accordance with one aspect of the present invention, there is provided an apparatus for separating lighter and heavier fluids. The apparatus includes a basin into which lighter and heavier fluids flow tangentially and separate into a floating layer of the lighter liquid upon the heavier fluid. A lighter fluid removal tube has an inlet disposed below the fluid level, such that the lighter fluid removal tube removes fluid by gravity from the basin. A heavier fluid removal tube removes fluid from generally around the lighter fluid removal tube inlet, such that removal of the heavier fluid draws fluid toward the lighter fluid removal tube assisting in the creation of a vortex. A fluid removal rate control means is operatively connected with the heavier fluid removal tube for controlling the rate at which the heavier fluid is removed. The control means regulates the fluid removal rate such that the fluid removal rate varies with the depth of the lighter fluid removal tube inlet below the fluid surface. This causes a vortex which varies in size with the depth to continue funneling the lighter fluid from the surface into the lighter fluid removal tube. In this manner, the lighter and heavier fluid components are separated by gravity without mechanical assistance.

In accordance with another aspect of the present invention, there is provided a method of separating lighter and heavier fluids. The fluids are fed into a confined area in which a vortex is created. The lighter fluid flows into the vortex from which it is removed by a lighter fluid removal tube. The heavier fluid is withdrawn from the basin around the vortex assisting in the formation of the vortex. The heavier fluid is removed at a controlled rate which varies in accordance with the depth of the lighter fluid removal tube below the fluid surface. In this manner, the vortex varies in size in accordance with the depth from the surface to the lighter fluid removal tube.

A primary advantage of the present invention is that it automatically and continuously removes a floating layer of light fluid from the surface of a heavier fluid.

Another advantage of the present invention is that it provides a feed stream which is rich in the light fluid at a rate and concentration which is appropriate for continuous automatic decanting.

Another advantage of the present invention is that it removes even thin oil films economically, frequently at a cost which is offset by the recovered oil.

Yet, another advantage of the present invention is that the separation of the floating light fluid from the heavier fluid continues unimpaired as the fluid level fluctuates.

Still further advantages will become apparent to those of ordinary skill in the art upon reading and understanding the following detailed description of the preferred embodiments.

BRIEF DESCRIPTION OF THE DRAWINGS

The invention may take form in various parts and arrangements of parts or in various steps and arrangements of steps. The drawings are only for purposes of illustrating a preferred embodiment of the present invention and are not to be construed as limiting it.

DETAILED DESCRIPTION OF THE PREFERRED EMBODIMENTS

Figure 1:
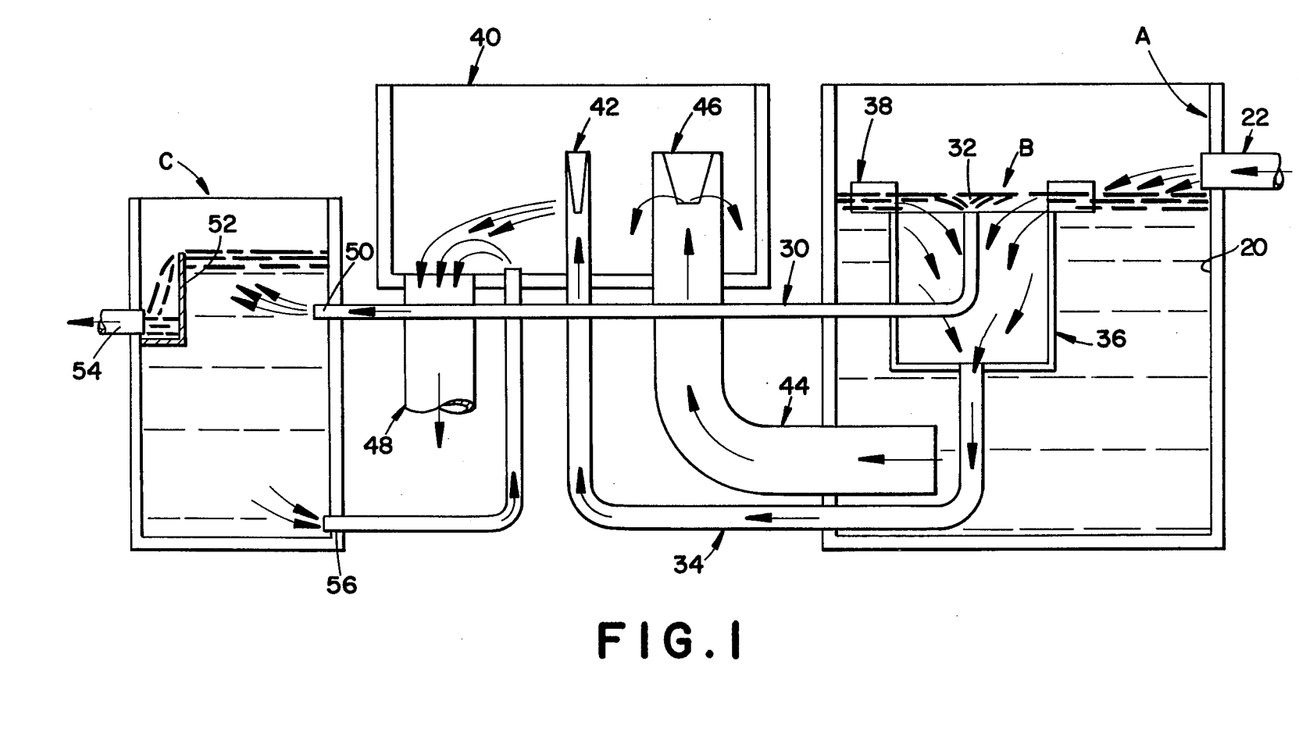
FIG. 1 is a diagrammatic illustration of a light fluid concentrator in combination with a multi-density fluid receiving basin and a downstream processor.

With reference to FIG. 1, lighter and heavier fluids to be separated are received in a basin region A. A lighter fluid concentrator B divides the fluids into a lighter fluid component rich flow and a heavier fluid flow. The lighter fluid rich flow is conveyed to a downstream processing means C for further processing or refinement. The heavier fluid flow is discarded or may be further processed, if appropriate.

Figure 2:
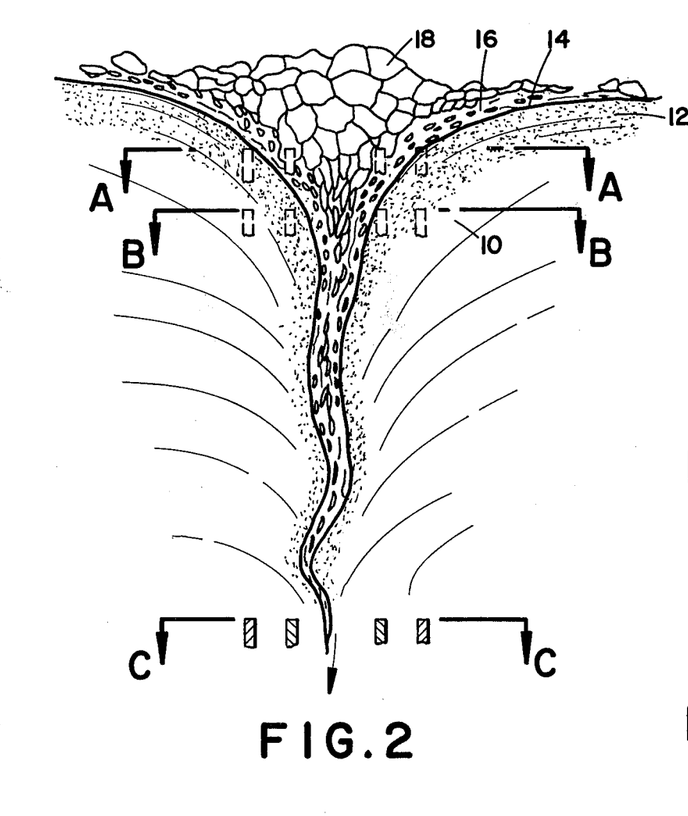
FIG. 2 is a cross-sectional view of a fully developed free vortex with layers of successively denser fluids arranged concentrically from the center line outward.
Figure 2A:
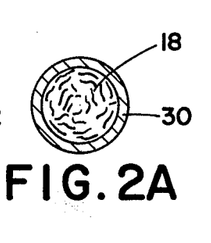
FIGS. 2A, B, and C are transverse cross-sectional views of lighter fluid concentrate entering a one-inch bore as viewed through sections A—A, B—B, and C—C, respectively of the constant circulation vortex of FIG. 2.
Figure 2B:
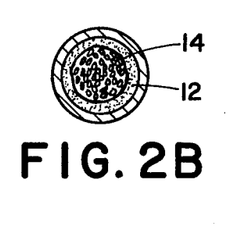
Figure 2C:
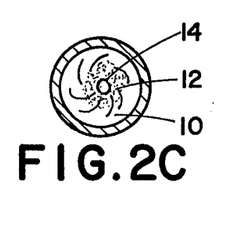
Figure 3A:
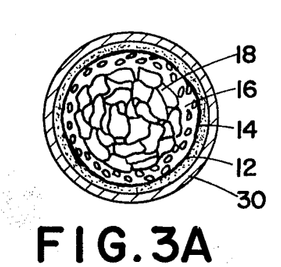
FIGS. 3A, B, and C are transverse cross-sectional views of lighter fluid concentrate entering a two-inch bore as viewed through sections A—A, B—B, C—C, respectively of the constant circulation vortex of FIG. 2.
Figure 3B:
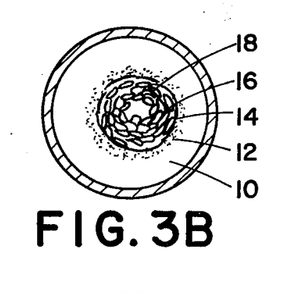
Figure 3C:
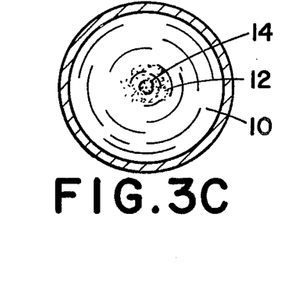

The basin fluid, having fluid components of differing densities, commonly separates under gravity into a multiple strata. With reference to FIG. 2, a typical stratified mixture includes a layer of a heavier liquid 10 such as water, acid, alkali, or the like. A layer of emulsion or floc 12 is frequently found floating on the heavier layer. The emulsion or floc layer commonly contains significant amounts of the heavier fluid in which an emulsion of the lighter fluid or particles are suspended. A stratum of lighter fluid 14 such as oil or other petroleum products, and the like, floats above the heavier fluid layer. Although in many cases the lighter fluid stratum is the uppermost, frequently a froth stratum 16 and a foam or bubble stratum 18 float on the light fluid layer.

With reference to FIGS. 2, 2A, 2B, 2C, 3A, 3B, 3C, 4A, 4B, and 4C, when a vortex is developed, the strata are drawn into a generally conical shape with the lightermost layers toward the center and the denser layers arranged concentrically outward. The thickness of the strata decrease in width toward the apex of the cone with the lighter strata decreasing more rapidly than the heavier strata.

With reference to FIG. 1, the basin region A includes at least a peripheral wall 20 such that the height of the fluid within the basin relative to the concentrator means B is controllable. The basin provides a still place for components of different densities to stratify, e.g., for an oil component to float to the surface of a water component. An inlet means 22 introduces the fluid mixture to be separated into the basin. Preferably, the inlet means 22 introduces the incoming fluid mixture tangentially in one or more flows such that a rotary motion is imparted to the basin fluid commensurate with the rate of inflow.

Figure 5:
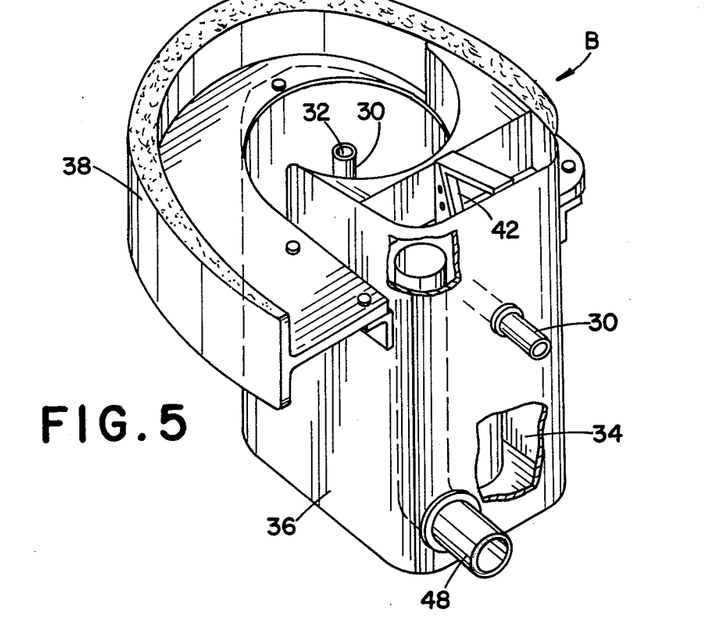
FIG. 5 is a prospective view of a preferred embodiment of a lighter fluid concentrator in accordance with the present invention; and, FIG. 6 is a diagrammatic illustration of a separator system for foam, light fluid, and heavy fluid.

With particular reference to FIGS. 1 and 5, the concentrator B is disposed in the basin to remove a selected stratum therefrom. Particularly, the concentrator skims the oil component to produce a concentrated stream thereof and a separate substantially pure stream of water or heavier fluid. In the embodiment of FIG. 1, components of the concentrator are distributed further apart than in the embodiment of FIG. 5 for simplicity of illustration. Common elements in FIGS. 1 and 5 are denoted by the same reference numeral. The concentrator B includes a lighter fluid removal tube 30 having a substantially horizontally disposed inlet 32 at its uppermost end. In this manner, the lighter fluid is received in the lighter fluid removal tube and discharged by gravity therethrough. A heavier fluid removal tube or passage 34 draws the heavier fluid from generally around and below the lighter fluid removal tube for discharge. The heavier fluid removal tube terminates its inlet end in a cylinder 36 which extends concentrically around the lighter fluid removal tube 30 and terminates substantially level with the inlet. The cylinder 36 performs a dual purpose. First, it crowds the floating layer into an annular space surrounding the concentrate pipe inlet 32. Second, it stabilizes the position of the free vortex that forms over the concentrate pipe inlet. Together this produces a substantially constant flow of the lighter fluid to the downstream processor C. The heavier fluid removal cylinder 36 and removal tube 34 draw the heavier fluid concentrically around the lighter fluid removal tube increasing the vortex effect in accordance with the speed at which the heavier fluid is withdrawn. A vortex enhancing means, such as a shroud 38, allows a vortex to form by gravity as the lighter and heavier fluid layers flow into the cylinder 36. The shroud is reversibly attached to the cylinder such that it is reversible for northern or southern hemisphere use to clockwise or counter clockwise vortex rotation. Optionally, a plurality of tangentially oriented vanes may direct the fluids tangentially toward the concentric lighter and heavier fluid removal tubes tangentially such that the fluids spiral inward, thereby enhancing the vortex.

The heavier fluid removal tube is connected with a fluid removal rate control means 40 for controlling the rate of fluid removal from the basin A. The level of the fluid in the basin need not and, in fact, is not held constant. Rather, changes in the flow rate of incoming fluids cause corresponding changes in both the depth and circulation within the basin. Once a vortex is established, substantially the same vortex is maintained as the fluid depth increases by increasing the circulation as the square of the depth. Because the circulation is directly proportional to the velocity of the incoming fluid, the rate control means causes flow through the removal tubes to increase in order to permit circulation to increase as the square of depth. The bore of the lighter fluid removal tube 30 is selected to limit flow therethrough to the maximum processing rate of the automatic downstream processing means C. The maximum flow rate through the lighter fluid removal tube is a small fraction of the normal flow rate into the basin. Accordingly, increases in incoming fluid flow are handled primarily by the heavier fluid removal tube 34.

The fluid removal rate control means 40 controls the flow of fluid therethrough such that the circulation is generally proportional to the square root of the depth of the lighter fluid tube inlet 32 below the surface of the fluid mixture in the basin. To achieve this flow rate, the control means 40 defines a control slot 42 therein. A slot bottom is substantially parallel with the lighter fluid tube inlet 32.

On occasion, the basin A may receive fluid at a rate which is too great to be handled by the combined capacities of the lighter and heavier fluid tubes 30 and 34. In the preferred embodiment, the lighter and heavier fluid tubes are adapted to handle up to about 100 gallons per minute. To handle a more rapid inflow of the water or other heavier fluid, a secondary drain tube 44 is provided. The secondary drain tube draws water from the bottom of the basin and discharges it through a secondary drain slot 46. The slot 46 has a bottom surface which is disposed a short distance, e.g. one inch, above the bottom of the first slot 42. When fluid is being received at a rate greater than 100 gallons per minute, the secondary drain tube and the secondary drain tube slot 46 along with control slot 42 control the fluid level in the basin. The heavier fluid from the control slot 42 and the secondary drain slot 46 fall freely from the slots and exit by a drain 48. The drain is larger in capacity than the combined capacity of the heavier fluid tube 34 and the secondary drain 44 such that the water falls freely from the slots enabling the flow through the slots to maintain the proper level in basin A.

The configuration of the control slots 42 and 46 may be derived by a calculation based on the relationship between the flow rate, circulation rate, and the depth of the concentrator pipe inlet, or by trial and error. Because the characteristics of flow, circulation, and depth will vary from basin to basin, the characteristics of the control slots normally must be determined individually for each basin.

Calculation of the control slot characteristics is a three-step process. The first step is to determine the relationship of the incoming flow to the basin fluid mass circulation. The mass velocity of the incoming fluid determines the energy input into the basin system. The shape, size, position, and orientation parameters of the inlet are determinative of the potential circulation. The shape, size, and presence of obstructions within the basin determine the efficiency with which the energy of the incoming fluid is transformed into rotary motion of the fluid mass within the basin. That is, the energy available to drive the free votex is determined from the energy of the incoming fluid reduced by any inefficiency in the transmission of the incoming energy to the fluid mass in the basin.

The capacity of downstream continuous, automatic concentrator C determines the maximum permissible bore of the concentrator tube 30. The bore of the concentrator tube is, in turn, determinative of the diameter of the desired light liquid diameter in the vortex at the concentrator pipe inlet 32. That is, the diameter of the light liquid flow in the vortex at the depth of the concentrator pipe inlet should be maintained less than the bore of the lighter fluid removal tube 30.

From the circulation determined in the first step, the depth of the concentrate pipe inlet 32 below the basin level is calculated. Specifically, the calculated depth is the depth which produces the desired diameter of lighter fluid flow in the vortex. It has been found that this lighter fluid vortex diameter holds fairly constant between a depth of three times the lighter liquid concentrate pipe inlet diameter to a maximum permissible operating depth.

The maximum permissible operating depth is the depth at which the tangential velocity at the concentrator pipe inlet is so high that interstitial sheer causes redispersion of light liquid, which redispersion interferes seriously with the efficiency of the downstream continuous, automatic decanting system C. It has been found that with delicate floc the maximum permissible depth is about three inches whereas with high viscosity oil, the maximum permissible depth is about eight inches.

If the depth at which the light liquid vortex diameter decreases to the diameter of the concentrator tube inlet is below the maximum permissible operating depth, it is necessary to decrease the circulation to flow ratio which, in turn, reduces the depth required to maintain the selected light liquid vortex diameter.

When the depth of the light liquid concentrator tube inlet is less than three times its diameter, the flow of lighter fluid thereto is a substantial portion of the total flow out of the basin. When the flow through the concentrator tube 30 becomes a substantial portion of the flow leaving the basin, the heavy fluid flow through slots 42 and 46 is not in total control. Rather, more of the low density light liquid fluids report to the lighter liquid concentrate tube inlet when these conditions are met. However, the in flow rate into the basin must be relatively low for this condition to exists. Because thicker layers of the lighter fluid are removed more quickly than thinner layers, it has been found that for purposes of the calculation, the average flow of the lighter liquid may be used. In practice, the lighter fluid layer is normally reduced to the thickness that causes a spread velocity equal to the forward velocity of the fluid in the basin or the inward spiraling velocity of the introduced surface current. The clearing time factor, in other words, is substantially determined by the transport time rather than the system capacity. Provided that the depth to the square of the circulation relationship is maintained, new calculations need not be made for each fluid level in the basin.

Having determined the heavier fluid flow rate which is required to maintain the depth to circulation relationship, the size of the opening for passing this flow is calculated for each depth. It has been found that this produces slots which are generally an inverted trapezoid with straight sides flarring outward from the bottom toward the top of the slot.

In the trial and error method, the incoming fluid flow is increased in steps. The flow rate of the heavy liquid through the slot is adjusted until a depth is provided at which the fluid flowing through the concentrator tube 30 has a desired composition of light liquid components.

This flow rate is recorded and used to calculate the dimensions of the control slot.

When a concentrator is installed in a basin with an existing collection of multi-viscosity liquids, the removal of the lighter fluid layers often changes the nature of the light liquid being removed. At first, the lighter fluid components tend to be relatively heavy and tar-like. However, after removal of accumulated lighter fluid layers, the removed lighter fluid becomes essentially identical to the new product that is being spilled in the basin. Accordingly, it is frequently advantageous to alter the flow control opening to compensate for the change in the lighter fluid component being withdrawn and to increase the efficiency of the downstream lighter fluid concentrating processing system C. For example, in some instances it would be desirable to reduce the bore of the light liquid concentrate tube 30 and to change the configuration of the control slots in order to compensate for the lighter fluid being withdrawn.

Once the control slot 42 is set, the same procedure is carried out on the secondary drain slot 46.

In a preferred embodiment in which oil is separated from water, the lighter fluid or concentrator pipe 30 has a diameter of one inch. The diameter of the heavier fluid component tube 34 is selected to pass about 100 gallons of fluid per minute when the surface level is five inches above the concentrator inlet 32. The diameter of the cylinder 36 is chosen such that the downward velocity therethrough is less than ten feet per minute. The rim of the cylinder 36 is disposed level with or below the concentrator pipe inlet in order to maintain an inward radial velocity near but less than ten feet per minute. The bottom of the secondary drain slot 46 is disposed about one inch above the bottom of the control slot 42.

The decanter C receives the lighter fluid at an inlet 50. Oil or other lighter materials float to the top and over a baffle or overflow rim 52 to an oil or lighter fluid component outlet 54. The heavier fluid or water exits through a drain 56 which is operatively connected with drain 48.

Normally, the decanter C requires at least a square foot of tank surface area for each gallon per minute of received concentrate flow. Frequently, the capacity of the decanter is a limiting factor in the design criteria of the concentrator B. The height of the decanter is determined by the time required for small water droplets to fall out of a thicker layer of floating oil. Commonly the decanter is one to ten feet in height. The diameter of the concentrate pipe 30 is selected such that it supplies a gallon per minute per square foot of decanter tank when the basin level is at its maximum. Commonly, the decanter pipe is dimensioned to supply the maximum decanter capacity at full bore with a five inch head. Other continuous, automatic processing equipment such as filters, centrifuges, magnetic separators, and the like, may advantageously be employed to process the lighter fluid more completely. It should be noted that no pumps are necessary to move the concentrate. The agitation associated with pumping causes redispersal of the lighter fluid into the heavier. Additional separation steps and time would be necessary to separate the fluids and compensate for the pumping action.

Figure 4A:
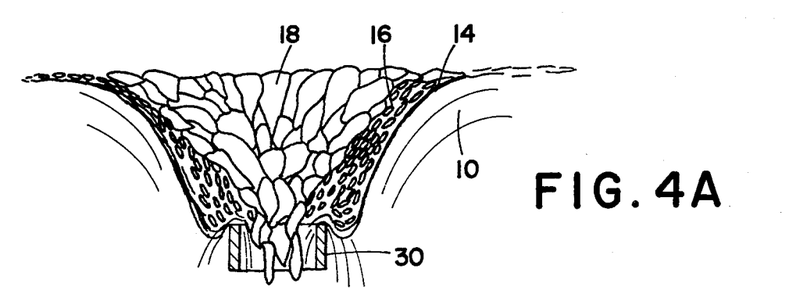
FIGS. 4A, B, and C are cross-sectional views of a vortex discharging into a constant depth bore as the circulation rate is progressively decreased.
Figure 4B:
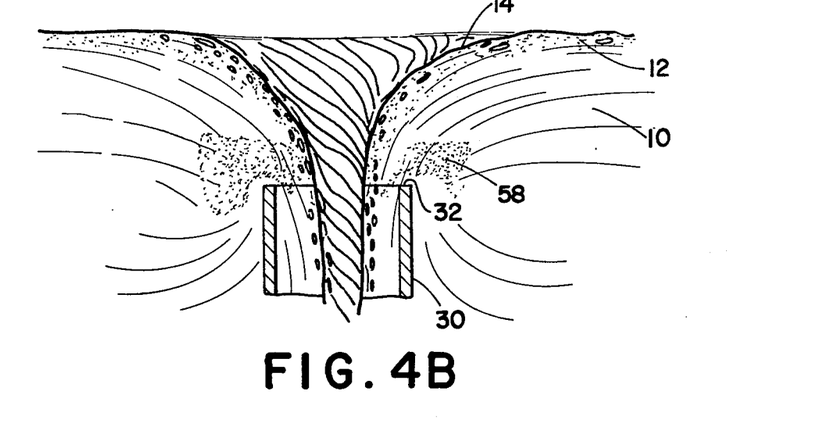

FIG. 4B illustrates a nominal vortex for separation of lighter and heavier fluid components in which the diameter of the vortex at the lighter fluid tube inlet 32 is substantially one-half its diameter. As the depth and circulation increase, shear between the rotating lighter fluid components and the more nearly stationary heavier fluid components tends to cause an emulsion halo 58. The heavier components are held more stationary by friction with the lighter fluid inlet tube exterior surface.

Figure 4C:
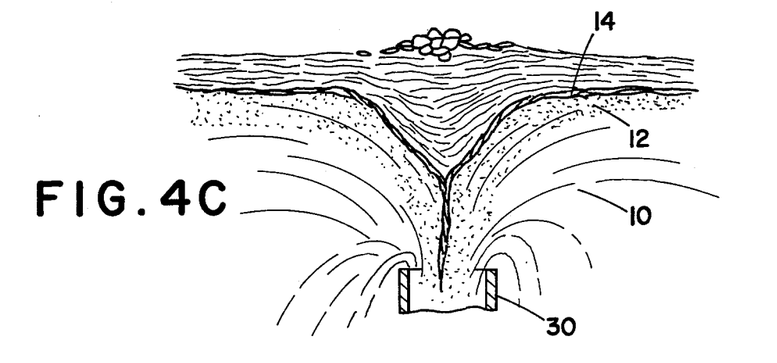

If the circulation becomes too slow or the depth too great, the vortex will change shape as shown in FIG. 4C. At the low circulation rate, relatively little of the light fluid component 14 is drawn into the light fluid removal tube. However, the emulsion or floc stratum 12 is drawn readily into the lighter fluid removal tube. Thus, by reducing the circulation relative to the depth, the nature of the vortex can be altered to draw a higher percentage of the floc and emulsion stratum relative to the lighter fluid, foam, and froth strata.

With reference to FIG. 4A, increasing the circulation relative to the depth dilates the vortex. When the circulation is sufficiently high relative to the depth of the lighter fluid inlet, the lighter fluid stratum of the vortex is held outside the lighter fluid inlet. Dilating the vortex allows a relatively high percentage of froth and foam strata 16, 18 to be drawn into the lighter fluid removal tube. A relatively thin flow of the heavier fluid 10 as well as a relatively small percentage of the lighter fluid component are also removed.

Figure 6:
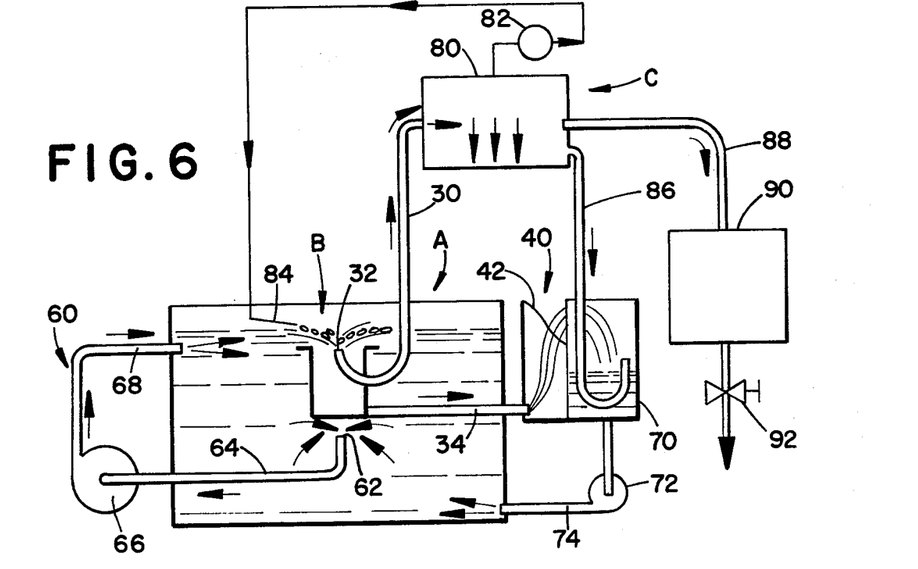

With reference to FIG. 6, by taking advantage of the different strata which are drawn off with variations in the vortex, the separation apparatus can separate a wide variety of strata. In the embodiment of FIG. 6, like elements of the apparatus with the embodiments of FIGS. 1 and 5 are denoted by the same reference numerals. The basin A is filled with the fluid mixture to be separated. A lighter fluid component concentrator B is disposed centrally in the basin. A lighter fluid removal or concentrator tube 30 with an inlet 32 is disposed centrally in the concentrator for removing one or more of the lighter fluid components. A heavier fluid tube 34 connected with a heavier fluid cylinder 36 withdraws fluid from the concentrator. The rate at which fluid is withdrawn through tube 34 is controlled by a fluid flow rate controlling means 40.

A circulation means 60 establishes and maintains a strong fluid circulation in the basin. The circulation means withdraws fluid from the basin through a fluid circulation inlet 62 disposed coaxially below the lighter fluid tube or concentrator inlet and the heavier fluid cylinder. The fluid is drawn through circulation tubing 64 to a pump 66 and is returned through tubing 68 tangentially into the basin adjacent the surface. The pump 66 pumps the fluid at a sufficiently high flow rate that fluid in the basin is maintained in a state of violent agitation. That is, a state of agitation which causes the lighter and heavier liquid components, such as oil and water, to remain mixed together and allows only the lightest froth and foam components to float.

The mixture of liquids from the rate control means 40 is received in a fluid reservoir 70. A pump 72 pumps fluid from the reservoir back into the basin through a return line 74 tangentially to assist in maintaining the circulation. The return line 74 forms a closed system such that the heavier fluid is retained. This closed system finds particular application in wash baths for manufacturing processes in which the heavier wash fluid is recirculated and reused. Optionally, the return pump 72 may be connected directly with the heavier fluid tube 34. In a closed system which maintains a substantially constant level in the basin or tank 20, the pump may operate at constant speed. If the basin level fluctuates, the pumping rate of the return pump 72 may be varied to maintain a constant lighter fluid vortex diameter at the lighter fluid removal tube inlet. In this manner, the return pump 72 functions as the flow rate control means 40.

The concentrator tube 30 is connected with a downstream lighter fluid component processing means C. Particularly, the lighter fluid removal tube is connected with a sealed decanting chamber 80. A blower or gaseous substance pump 82 draws a vacuum in the decanting chamber 80 and pumps a flow of air or gas to one or more air nozzles 84. The air nozzles are disposed adjacent the light fluid removal tube inlet 32. The froth and foam tend to be relatively rigid and form a self bracing ring around the eye of the vortex. This ring blocks the movement of additional froth and foam into the vortex center. The air from the jet 84 breaks up the bracing ring and sweeps the froth and foam into the vortex center. A return line 86 returns heavier fluid components from the decanter chamber 80 to the reservoir 80 for recirculation.

Once the foam which contains a high percentage of the contaminants is removed, operation of the pump 66 is terminated or reduced. Fluid from lines 64 and 68 is returned to the basin raising its liquid level. The increase in the fluid level and the decrease in circulation contracts the vortex from the dilated state of FIG. 4A to the state of FIG. 4B. The lighter liquid components float to the surface and are drawn into the light component removal tube 30. The slot 42 of the flow rate control means 40 returns heavier fluid components to the pump 72 at the appropriate flow rate for the depth of fluid in the basin. The lighter fluid components and emulsions are drawn by the vacuum created by blower 82 into the decanting chamber 80. Lighter fluid components from the decanting chamber 80 are conveyed by tube 88 to a lighter fluid storage tank 90 which is sealed by an outlet valve 92. The outlet valve 92 maintains the vacuum created by blower 82 throughout the decanting chamber 80 and the lighter fluid storage tank 90. From time to time, the valve 92 is opened to remove the lighter fluid stored in the lighter fluid storage tank.

The invention has been described with reference to the preferred embodiment. Obviously, modifications and alterations will occur to others upon reading and understanding the preceding detailed description of the preferred embodiments. It is intended that the invention be construed as including all such alterations and modifications insofar as they come within the scope of the appended claims or the equivalents thereof.

Having thus described a preferred embodiment, the invention is now claimed to be:

1. An apparatus for automatically and continuously and decanting a layer of a lighter fluid which is floating upon a heavier fluid, the apparatus comprising:
   a fluid inlet for discharging lighter and heavier fluids into a basin in such a manner that the rate of discharged fluid causes a corresponding rotation of fluid within the basin, the lighter and heavier fluids received in the basin tending to separate with the lighter fluid rising and forming and floating layer upon the heavier fluid;
   a lighter fluid removal tube having an inlet positioned in the basin for receiving a lighter fluid concentrated fluid flow, the lighter fluid removal tube being operatively connected with an automatic, continuous decanting means in such a manner that the concentrated fluid flows to the decanter at the urging of a pressure differential between the lighter fluid removal tube inlet and the automatic, continuous decanter means, the pressure differential being caused by one of (a) gravity attributable to a difference in altitude between the inlet and the decanter means and (b) an artificially created pressure differential within the decanter, the concentrated fluid flow being limited in rate by the bore of the lighter fluid removal tube;
   the automatic, continuous decanter means separating the heavier fluid from the lighter fluid at a rate which is greater than the maximum concentrated fluid flow rate through the lighter fluid removal tube;
   a heavier fluid withdrawing tube positioned in the basin for removing heavier fluid therefrom, the heavier fluid withdrawing tube having an inlet disposed generally below the lighter fluid removal tube inlet such that removal of virtually the entire flow of heavier fluid serves the dual purpose of transporting the floating layer of lighter fluid toward the lighter fluid removal tube inlet and of establishing a free vortex which is reinforced by the flow of lighter fluid into the lighter fluid removal tube in order to draw the floating lighter liquid into the lighter fluid removal tube;
   a heavier fluid removal flow rate control means for controlling a rate of heavier fluid flow through the heavier fluid withdrawing tube, the heavier fluid removal flow rate control means including an opening with upward divergent sides operatively connected with the heavier fluid withdrawing tube for controlling the rate of heavier flow from the basin at a rate that maintains the depth of the lighter fluid removal tube inlet below the lighter fluid surface generally in direct proportion to the square root of the circulation of the fluid mass within the basin in such a manner that a constant diameter of lighter fluid is maintained surrounding an eye of the free vortex disposed at the lighter fluid removal tube inlet, whereby the concentrated fluid flow passing to the decanter maintains a substantially constant lighter fluid portion even as fluid flow into the basin fluctuates; and,
   a means for maintaining a liquid surface level at a point immediately downstream from the heavier fluid removal flow rate control opening.

2. An apparatus for separating a lighter fluid from a heavier fluid, the apparatus comprising:
   a basin for receiving the lighter and heavier fluids for separation;
   a lighter fluid removal tube having a generally horizontal inlet positioned in the basin for receiving a fluid rich in the lighter fluid and for removing it to a downstream processing apparatus;
   a heavier fluid withdrawing tube positioned in the basin for removing the heavier fluid from the basin, the heavier fluid withdrawing tube having an inlet disposed generally below the lighter fluid removal tube inlet such that the removal of the heavier fluid tends to assist in the creation of a vortex around the lighter fluid removal tube inlet;
   an automatic fluid removal rate control means operatively connected with the heavier fluid removal tube for controlling the fluid removal rate from the basin in accordance with a distance between an upper surface of fluid in the basin and the lighter fluid removal tube, such that the vortex extends from the fluid surface into the lighter fluid removal tube with a substantially constant diameter at the lighter fluid removal tube inlet even as the distance between the fluid removal tube and the fluid surface varies.

3. The apparatus as set forth in claim 2 wherein the lighter fluid removal tube has a first diameter at the generally horizontal inlet and wherein the rate control means maintains the fluid level in the basin above the lighter fluid removal tube inlet by a distance in the range of 1 to 2 times the said first diameter, whereby the lighter fluid removal tube removes fluid with a high concentration of the lighter fluid.

4. The apparatus as set forth in claim 2 wherein the rate control means removes the heavier fluid faster with higher fluid levels such that a larger vortex is created and slower with lower fluid levels such that a smaller vortex is created.

5. The apparatus as set forth in claim 2 wherein the rate control means includes means for defining a first slot through which the removed heavier fluid flows.

6. The apparatus as set forth in claim 5 wherein the slot has a cross-sectional area which allows fluid flow therethrough such that the distance between the basin fluid level and the lighter fluid removal tube inlet varies in proportion to the square root of a speed of rotation of the vortex.

7. The apparatus as set forth in claim 5 wherein the first slot has a first lower edge which is substantially level with or below the lighter fluid removal tube inlet and the first slot extends upward and diverges outward therefrom.

8. The apparatus as set forth in claim 5 wherein the rate control means further includes a secondary drain tube extending from a lower region of the basin, the secondary drain tube having a second divergent slot adjacent its fluid discharge end, the second slot having a second lower edge disposed above the first slot lower edge, whereby the first and second slots control fluid level in the basin at levels above the second lower edge.

9. The apparatus as set forth in claim 2 further including pump means for pumping at least the heavier fluid from generally below the lighter fluid removal tube and tangentially back into the basin such that the circulation is increased and the vortex dilates.

10. The apparatus as set forth in claim 9 including a foam layer floating on lighter and heavier fluid layers and wherein the pump means increases the vortex sufficiently that ambient air and foam are drawn into the lighter fluid removal tube and further including pressure differential means for creating a pressure differential across the lighter fluid removal tube inlet to draw foam into the lighter fluid removal tube.

11. The apparatus as set forth in claim 10 wherein the pressure differential means further includes an air jet disposed generally adjacent and above the lighter fluid removal tube inlet for directing foam into the vortex, whereby relatively stiff islands of foam are inhibited from bridging the vortex.

12. The apparatus as set forth in claim 9 further including a tank for separating the foam and lighter fluid from the heavier fluid, the separating tank being connected with a lighter fluid and foam storage tank and having a heavier fluid drain line and further including a circulation pump operatively connected with the separation tank drain line and the level control means for pumping heavy fluid therefrom tangentially into the basin.

13. A method of separating at least a heavier and a lighter fluid, the method comprising:
introducing the lighter and heavier fluids into a region;
creating a vortex within the region such that the vortex receives a higher concentration of the lighter fluid centrally therein;
removing the lighter fluid from the vortex with a lighter fluid receiving tube at a variable lighter fluid removal distance below an upper surface of the fluid level in the region;
removing the heavier fluid from generally around the vortex such that removal of the heavier fluid assists the formation of the vortex; and,
adjusting the heavier fluid removal rate in accordance with the distance between an upper surface of the fluid in the basin and the lighter fluid removal tube, such that the vortex extends from the fluid surface into the lighter fluid removal tube diameter at the lighter fluid removal tube inlet even as the distance between the fluid removal tube and the fluid surfaces varies.

14. The method as set forth in claim 13 further including the step of removing the heavier fluid at a variable rate which controls the fluid level in the basin and limits the fluid level generally to a preselected maximum level.

15. The method as set forth in claim 13 further including the step of continuously decanting the removed lighter fluid.

16. The method as set forth in claim 13 further including the step of introducing fluid tangentially into the region to enlarge the vortex.

17. The method as set forth in claim 13 further including removing fluid from below the vortex and reintroducing it tangentially at a selectably controllable rate for selectably controlling dilation of a core of the vortex.

18. The method as set forth in claim 17 further including contracting the vortex core to remove particles suspended in an upper portion of the heavier fluid adjacent the lighter fluid.

19. The method as set forth in claim 17 further including dilating the vortex core to withdraw a foam layer floating on the lighter and heavier fluids.

20. The method as set forth in claim 19 further including the step of creating a pressure differential which urges foam floating on the lighter and heavier fluids into the vortex such that the removal step includes at least removal of the foam.

* * * * *